April 5, 1960  G. I. SCHREIBER  2,931,283
FILM TRANSPORT ASSEMBLY FOR CAMERAS
Filed Feb. 4, 1958  2 Sheets-Sheet 1
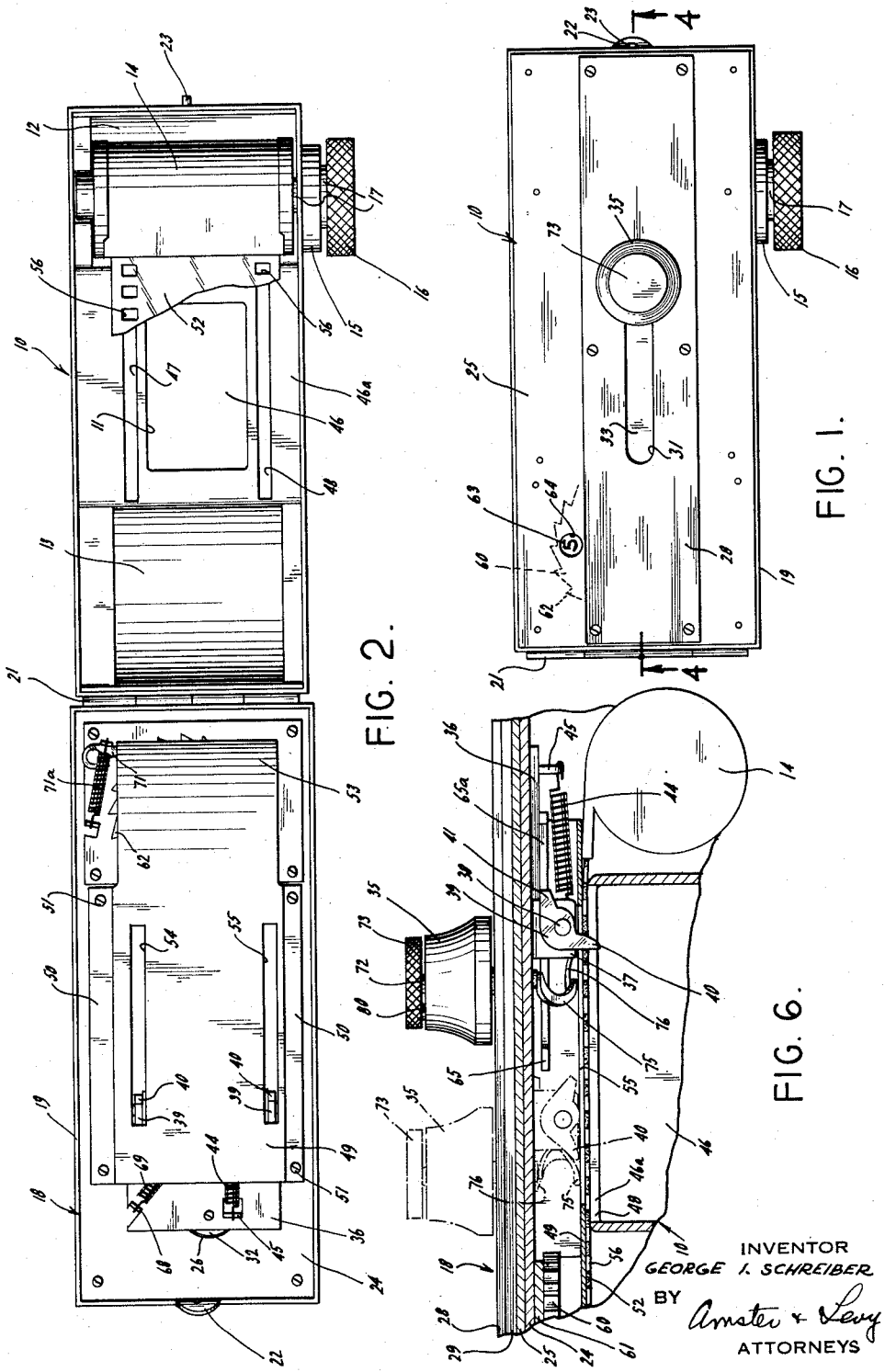
INVENTOR
GEORGE I. SCHREIBER
BY Amster & Levy
ATTORNEYS April 5, 1960 G. I. SCHREIBER 2,931,283
FILM TRANSPORT ASSEMBLY FOR CAMERAS
Filed Feb. 4, 1958 2 Sheets-Sheet 2

INVENTOR
GEORGE I. SCHREIBER
BY Amster & Levy
ATTORNEYS

United States Patent Office 2,931,283
Patented Apr. 5, 1960

2,931,283

FILM TRANSPORT ASSEMBLY FOR CAMERAS

George I. Schreiber, Asbury Park, N.J.

Application February 4, 1958, Serial No. 713,120

7 Claims. (Cl. 95—31)

The present invention relates to improvements in cameras and in particular to an improved film transport assembly for use with cameras employing miniature type film having sprocket holes, such as 35 millimeter film.

With the recent improvement in film both color and black and white, there has been a great increase in popularity of the 35 millimeter camera for both amateur and professional use. Unlike with standard roll film, the 35 millimeter film is not paper-backed, but instead is loaded within cassettes or magazines from which the film is unspooled onto a take-up spool within the camera, and later returned to magazine or cassette in order to remove it from the camera. In conventional cameras, the leading end of the film is attached to a take-up spool, and the film is advanced by turning the take-up spool by means of a crank, winding knob, or similar means.

Conventional film advancing mechanisms for 35 millimeter cameras are thus adapted to advance the film by turning the take-up spool, the film being thereupon wound onto the take-up spool and drawn from the film magazine. For turning the film spool, a complex and expensive transmission assembly is required with accurate gearing and the like, particularly if the so-called "automatic" film transport is provided wherein the film is advanced by the distance of one frame upon depression of a lever. In addition, as has already been mentioned, the 35 millimeter film has no paper backing so that the cameras must be completely enclosed and light-tight, there being no windows for visual determination of the length of the film advance. Consequently, automatic stop means must be provided to limit the turning of the take-up spool to such a degree as to advance the film by a distance equal to one exposure frame. Such stop means is normally also of a complex nature and adds to the cost of camera manufacture.

It may also be mentioned that in conventional miniature cameras, the requirement of advancing the film by a distance of exactly one frame presents a problem even where costly precision film transport mechanism is provided. The film transport assembly drives the take-up spool, but does not directly engage or drive the film. This permits variations in the distance of the film advance due to slippage, variations in the tightness of the film windings, etc., which often results in uneven margins between exposure frames and even overlapping of the frames.

According to the present invention there is provided a film transport assembly comprising a slide member operable from the exterior of the camera and carrying film actuating fingers which engage the sprocket holes of the film and move the film itself past the image window of the camera. One advantage of this improved assembly is that the actuating knob on the exterior of the camera is slidable in a slot which limits its sliding movement exactly to the distance of one frame plus a suitable separating margin, and the actuating fingers present a positive direct drive for the film itself, moving the film the exact required distance.

An object of the present invention is the provision of a film actuating assembly of the character described which is of an extremely simplified structure compared to conventional assemblies and is economical in manufacture.

Another object of the invention is the provision of a film actuating assembly of the character described in which the film is allowed to roll itself up in a take-up chamber, eliminating the use of the conventional take-up spool and thereby increasing the amount of film in the magazine which can be used for exposure.

A further object of the invention is the provision of a film actuating assembly of the character described which includes a simplified film counting mechanism which is operable by movement of the slide assembly used to transport the film.

A further object of the invention is the provision of a film actuating assembly of the character described which also includes means for retracting the actuating fingers out of contact with the film sprocket holes so that the film may be rewound into the film magazine.

Additional objects and advantages of the invention will be apparent during the course of the following specification when taken in connection with the accompanying drawings, in which:

Fig. 1 is a plan view of the rear of a camera incorporating the invention showing the exterior of the rear cover which contains the film advancing and exposure counting assembly;

Fig. 2 is a plan view of the rear of the camera with the cover in open position, showing the interior of the camera body and the inner side of the cover.

Fig 6 is a partial section as taken along line 6—6 of Fig. 5.

Figure 3:
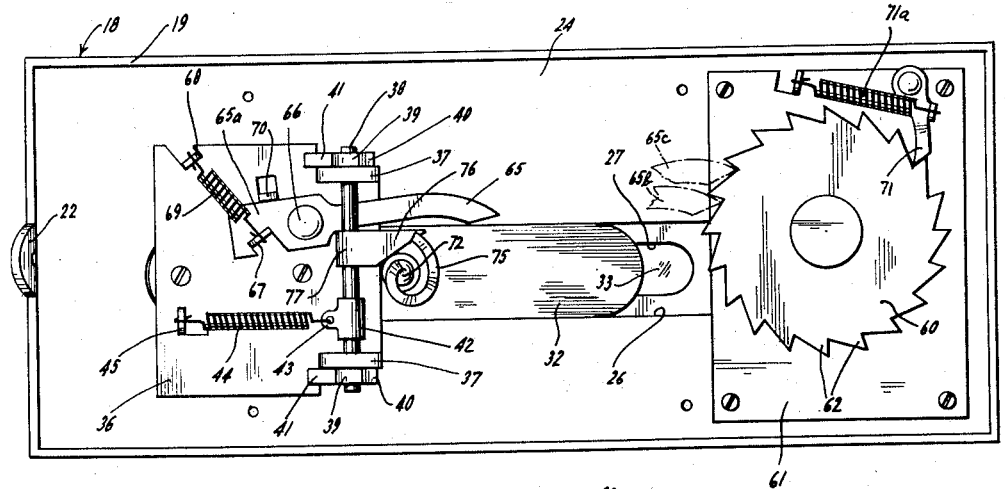
Fig. 3 is an enlarged plan view of the inner side of the camera rear cover in a position similar to that shown in Fig. 2, but with the pressure plate removed to reveal the structure of the film advancing and expose counting assembly.

Referring in detail to the drawings, there is shown a hollow body 10 forming part of a camera. The camera has the usual lens and shutter which are not shown herein since they form no part of the invention and may change in form depending upon the type of camera incorporating the invention. It is to be understood that the improved film transport assembly of the invention may be incorporated in any type of camera using film having sprocket holes, particularly 35 millimeter film.

The camera body 10 includes a rear image window 11 which is centrally located between a pair of film chambers 12 and 13. The chamber 12 constitutes a film loading chamber in which a film magazine 14 containing unexposed film may be loaded, and the chamber 13 constitutes a film take-up chamber for receiving the exposed portion of the film as the same is advanced past the image window 11 by the film transport assembly of the invention. Mounted in a bushing 15 of the camera body 10 is a film rewind knob 16 having a slotted shaft 17 which engages the hub of the film spool (not shown) located within the film magazine 14, for rewinding the film back into the magazine after the film has been exposed. The shaft 17 of the film rewind knob 16 is longitudinally slidable within the bushing 15 so that the slotted end of shaft 17 may be withdrawn from the magazine 14, whereby the magazine may be removed from the film chamber 12 for replacement.

The film chamber 13 has planar walls and is not provided with means for holding a take-up spool as is usual in cameras. An important feature of the invention is the elimination of the conventional film take-up spool, which permits simpler camera construction and also permits the use of the simplified film advance mechanism of the invention.

The camera has a removable rear cover 18 having an upstanding marginal flange 19 which tightly encases the ends of the side and end walls of the camera body 10. The rear cover 18 contains the film advancing assembly of the invention, and may be removably attached to the rear of the camera body in any suitable manner. For example, the rear cover 18 may be swingably connected to one end of the camera body 10 by a hinge 21, the other end of the cover 18 carrying a latch tongue 22 which engages and releasably locks to a catch piece 23 secured to the camera body.

Figure 5:
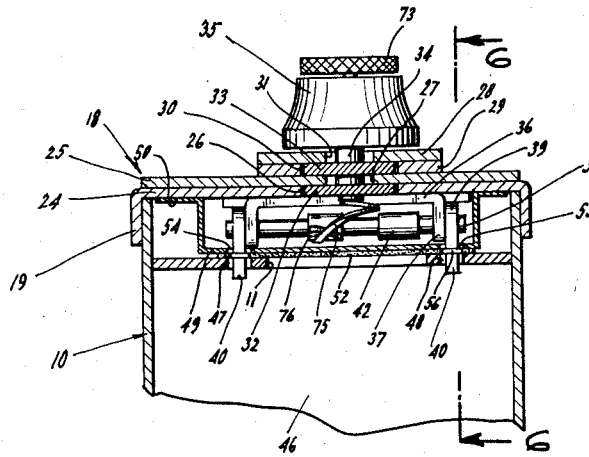
Fig. 5 is a vertical section taken along line 5—5 of Fig. 4.

The rear cover 18 has an inner wall 24 which is integral with the peripheral flange 19, and an outer wall 25 secured in flush abutment with the inner wall 24. The inner wall 24 has an elongated longitudinally-extending slot 26 and the outer wall 25 has a smaller longitudinally-extending slot 27 which registers with the slot 26, as shown in Figs. 3 and 5.

Figure 4:
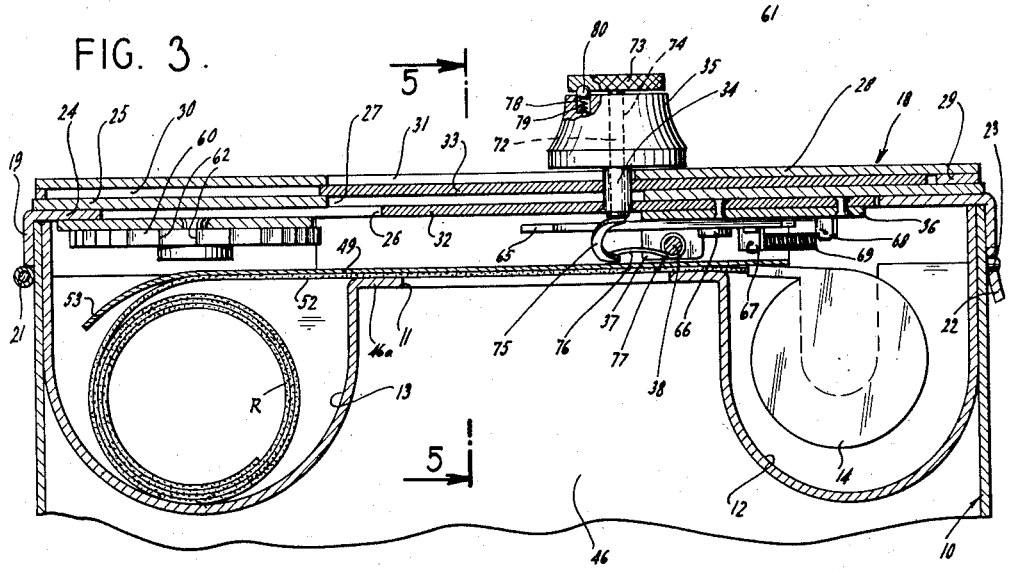
Fig. 4 is an enlarged section through the camera rear portion as taken along line 4—4 of Fig. 1.

A pair of narrow plates 28 and 29 are secured flush against each other and flush against the outer surface of the outer wall 25. As shown in Figs. 4 and 5, the inner plate 28 has an elongated longitudinal slot 30, while the outer plate 29 has a smaller and narrower slot 31 which registers with the slot 30. Both slots 30 and 31 register with the slots 26 and 27 of the inner and outer walls 24 and 25.

Slidably mounted in the tracks afforded by the aforementioned slots is a slide assembly operable from the exterior of the rear cover 18, and effective to advance the film successively by a distance of one frame past the image window 11. Said slide assembly comprises a pair of spaced, flat slide members 32 and 33 of such width as to fit snugly and to slide longitudinally in the respective slots 26 and 30. The slide members 32 and 33 are joined by a tubular shaft 34 which extends through both slide plates and is fixed thereto. The upper end of the tubular shaft 34 projects through the slot 31 in the top plate 29 and has an actuating knob 35 affixed thereto.

Secured to the bottom surface of the lower slide member 32 is a slide plate 36 having a pair of depending ears 37. A shaft 38 extends between and is journalled in the ears 37, the ends of shaft 38 having a pair of film actuating members 39 affixed thereto. Each of the film actuating members 39 has at one end a finger 40 for engaging the film sprocket holes, and a stop portion 41 at the other end which extends perpendicularly to the finger 40.

The shaft 38 carries a collar 42 which is rigidly fixed thereto and has an integral lug 43 to which is attached one end of a coiled tension spring 44. The other end of spring 44 is attached to an anchor post 45 which is integral with the slide plate 36. Tension of the spring 44 on the collar 42 normally maintains the shaft 38 in the position shown in Figs. 3 and 6, in which the fingers 40 of the film actuating members 39 are directed downwardly.

The camera body 10 has an enclosed image housing 46 which separates the reflected picture image from the film chambers 12 and 13. The rear wall 46a of this image housing 46 contains the image window 11 and also contains a pair of slots 47 and 48 which extend parallel to and are located on either side of the image window 11. The rear cover 18 also has a pressure plate 49 having angular flanges 50 extending along its side edges and affixed to the inner wall 24 of the rear cover as by screws 51 in such a manner that the pressure plate 49 extends parallel to and is spaced above the inner wall 24, covering the film advancing assembly, as can best be seen in Fig. 2.

When the rear cover 18 is in closed position, the pressure plate 49 overlies the image housing rear wall 46a and presses the film 52 withdrawn from the magazine 14 flat against the image window 11. The pressure plate 49 also has an arcuately-bent extension piece 53 which serves to guide the film into the film take-up chamber 13 in such a manner that the film 52 will form itself into a roll within said take-up chamber, as shown at R in Fig. 4.

The pressure plate 49 also has a pair of spaced longitudinal slots 54 and 55 which register with the slots 47 and 48 of the image housing rear wall 46a when the rear cover is in closed position as shown in Fig. 5. The film 52 has a line of sprocket holes 56 along both edges, which sprocket holes register with the aligned slots 47, 54 and 48, 55. The fingers 40 of the film actuating members 39 thus project downwardly through the slots 54 and 55 of the pressure plate 49, through a pair of sprocket holes 56 of the film, and through the registering slots 47 and 48 in the image housing rear wall 46a.

The film is advanced past the image body window 11 by sliding the actuating knob 35 from one end of the slot 31 to the other. Fig. 6 shows the actuating knob 35 at the righthand end of the slot 31, that is to say the end proximate to the film magazine 14. When an exposure is made on the film through the image window 11, the actuating knob 35 is slid to the left, the fingers 40 engaging the film sprocket holes 56, drawing the film from the magazine 14 and advancing it toward the take-up chamber 13. In this movement, the stop portions 41 of the film advancing members 39 engage the surface of the slide plate 36, as shown in Fig. 6, thus preventing the film advancing members 39 from pivoting on the shaft 38 in a counter-clockwise direction. The fingers 40 are therefore rigidly held in their depending positions for positive engagement with the sprocket holes 56. After the film has been advanced, however, the actuating knob 35 is slid back to its original position in a direction toward the film magazine 14. This movement of the fingers 40, toward the right in Fig. 6, causes the film advancing members 39 and their shaft 38 to pivot in a clockwise direction against tension of the spring 44 so that the fingers 40 are raised from the film sprocket holes 56. The fingers 40 thus travel over the sprocket holes 56 in their return movement, and the film 52 is not moved.

The slot 31 in the top plate 28 is sized the length of one frame constituting a film exposure. Thus, in advancing the film, when the actuating knob 35 is slid from one end of slot 31 to the other, the fingers 40 travel from one end of the image window 11 to the other, and the exposed film portion is moved past the image window and into the take-up chamber 13. At the same time, a fresh, unexposed portion of the film 52 is advanced into registry with the image window 11 for the next exposure. This advance of the film is accomplished quickly and easily by movement of the actuating knob 35 in a short and simple film advancing cycle from one end of the slot 31 to the other and back to the first end. At the end of the cycle, the actuating knob 35 is accurately positioned for the next film advance movement.

The slide members 32 and 33, in moving in their respective slots 26 and 30, not only guide the slide plate 36 during the film advancing cycle, but also cover up the slots 26, 27 and 31, preventing light from entering the camera. As can be seen in Fig. 4, when the actuating knob 35 is at the right-hand end of the slot 31, the left-hand end of the upper slide member 33 is covering over the ends of slots 26, 27 and 31, which would otherwise be open to the passage of light. It will be appreciated that when the actuating knob 35 is slid to the opposite left-hand end of the slot 31, the right-hand portion of slide member 33 will cover over the right-hand ends of the slots 26, 27 and 31.

The rear cover 18 is also provided with a counting mechanism for automaticaly counting the number of exposed frames, so that the user will be informed when the film is fully exposed and the film can then be rewound into the magazine 14 for removal from the camera. This counting mechanism includes a counter disc 60 rotatably mounted on a plate 61 secured to the inner wall 24 of the rear cover 18 and partially over-lying the slot 26. The counter disc 60 has a series of ratchet teeth 62 extending around its circumference. Normally, a roll of 35 millimeter film will produce twenty exposures. In the arrangement of the present invention, however, the necessity of manually withdrawing film from the magazine and threading such film on a take-up spool is eliminated, so that a greater portion of film contained in the magazine can be used for photographing. The counter disc 60 is therefore preferably provided with twenty-four ratchet teeth 62 for counting twenty-four exposures which is made possible by the film advancing mechanism, although in the drawings, for convenience of illustration, only twenty ratchet teeth are illustrated.

On its surface facing the plate 61, the counter disc 60 has imprinted or stamped thereon a circular row of numerals 63, shown in Fig. 1, these numerals being arranged adjacent the respective ratchet teeth 62 and conforming in number to the number of ratchet teeth. Thus, the numerals 63 would be numbered from one to twenty-four, if twenty-four ratchet teeth are provided. An aperture 64 extending through the plate 61 and the walls 24 and 25 is located to register with one of the numerals 63, thereby serving as a window through which the user can see the numeral identifying the exposure number from the outside of the camera.

The counting mechanism also includes a pawl arm 65 mounted by a pivot 66 on the slide plate 36. The pawl arm 65 has an extension portion 65a located on the opposite side of pivot 66 which has an upstanding lug 67. A tension spring 69 is connected at one end to the lug 67 and at the other end to a fixed lug or anchor 68 on the slide plate 36. As shown in Fig. 3, the spring 69 normally holds the pawl arm extension portion 65a in a position in which its edge is in engagement with an upstanding stop member 70 on the slide plate 36. In this position, the pawl arm 65 projects forwardly from the slide plate 36 and is located to engage one of the ratchet teeth 62 of counter disc 60 when the slide plate 36 is slid toward said counter disc.

When the actuating knob 35 is slid along slot 31 in a direction to advance the film, as previously described, the slide plate 36 is moved toward the counter disc 60, and the end of ratchet arm 65 engages one of the counter disc teeth 62, as shown in broken line at 65b in Fig. 3. Further movement of the slide plate 36 causes the ratchet arm 65 to turn about its pivot 66, turning the counter disc 60 in a clockwise direction by the distance of one tooth, as shown at 65c in Fig. 3. Thus, the counter disc 60 is turned upon each film advance movement of the slide plate 36 until the next succeeding numeral 63 appears at the window 64. Upon the return movement of the slide plate 36, the ratchet arm 65 is withdrawn from engagement with the counter disc 60 and its spring 69 causes it to turn back about its pivot 66 to its original position, shown in full line in Fig. 3, in which it is positioned to engage the next tooth of the counter disc 60.

In order to prevent the counter disc 60 from turning in a counter-clockwise direction when the ratchet arm 65 is withdrawn, and also to insure that a respective numeral 63 is always in registry with the window 64, a holding pawl 71 is pivotally mounted on the plate 61, a spring 71a normally urging the holding pawl 71 in engagement with a tooth 62 of the counter disc 60.

As was previously described, the slide plate 36 is moved successively through the film-advancing cycle by operation of the actuating knob 35 until all of the usable film 52 in the magazine 14 has been withdrawn, exposed and rolled up in the take-up chamber 13. In order to remove the exposed film from the camera, it now becomes necessary to rewind the film into the magazine. This is impossible to do however while the fingers 40 of the film actuating member 39 are in their normal depending positions in which they extend through the film sprocket holes 56. Retracting means are therefore provided for pivoting the actuating member 39 until its fingers 40 are positioned parallel to and spaced above the film 52 and are no longer in engagement with the sprocket holes.

The aforementioned retracting means includes a cylindrical shaft 72 having a flat, circular head piece or button 73 secured at its top end. The shaft 72 extends through a central through bore 74 in the actuating knob 35 and through the tubular shank 34, as can be best seen in Fig. 4. The bottom end of shaft 72 projects below the tubular shank 34 and has affixed thereto a cam member 75 in the form of a rigid metal strip bent into helical shape. The cam member 75 is positioned to engage a metal strip 76 having an integral collar 77 rigidly fixed to the shaft 38. The strip 76 projects forwardly from the shaft 38 and is located beneath the cam member 75, with the end of the helical cam member 75 spaced to one side of, and out of engagement with the strip 76, as shown in Fig. 3.

The cylindrical shaft 72 is turnably mounted in the actuating member bore 74 and the tubular shank 34 so that the head piece 73 may be rotated above the actuating knob 35 to turn the cam member 75. Rotation of the head piece 73 in a clockwise direction, as viewed in Fig. 6, moves the tip of the helical cam member 35 into engagement with the lower surface of the strip 76, and upon continued rotation of the head piece the helical cam surface of cam member 35 rides along the lower surface of the strip 76, causing the strip 76 to pivot upwardly. Since the strip 76 is affixed to the shaft 38, this pivoting movement of said strip causes the shaft 38 to rotate, in turn causing its fixed film actuating members 39 to turn in a direction to lift the figers 40 from the film sprocket holes 56, as shown in broken line in Fig. 6. The fingers 40 are thus lifted clear of the film 52 and the film can be rewound into the film magazine 14 by turning the film rewind knob 16.

The actuating knob 35 is provided with a small bore 78 containing a spring 79. A metal ball 80 is slidably contained within the bore 78, the upper end of the bore being seated in a dimple or concavity 81 in the lower surface of head piece 73. The upward tension of the spring 79 upon the ball 80 normally maintains the ball seated in the concavity 81, thereby normally holding the head piece 73 in the position shown in Fig. 3, in which the cam member 75 is clear of the strip 76 and the fingers are downwardly extending for gripping the film sprocket holes and advancing the film. The head piece 73 is thus releasably retained against accidental turning during use of the camera. When it is desired to rewind the exposed film, however, the head piece 73 may be forcibly turned, the ball 80 leaving the concavity and compressing the spring 79.

While a preferred embodiment of the invention has been shown and described herein, it is obvious that numerous additions, changes and omissions may be made in this embodiment without departing from the spirit and scope of the invention.

What I claim is:
1. For use in a camera having a film loading chamber sized to hold a film magazine containing a length of photographic film having sprocket holes, a film take-up chamber, an image window between said chambers, and means for rewinding the exposed film into the magazine, a film transport assembly comprising a slide plate, means for mounting said slide plate within said camera for sliding movement behind said image window, at least one finger carried by said slide plate and sized and positioned to engage a respective film sprocket hole at one side of said image window and carry it to the other side of said image window for advancing said film from said film magazine in the direction of said film take-up chamber, spring means urging said finger into contact with the film sprocket holes, an actuating knob slidably mounted outside said camera and connected to said slide plate for moving the latter, means for limiting the sliding movement of said actuating knob to the length of one exposure frame, and rotatable means on said actuating knob for manually retracting the finger from the film to permit rewinding of the film from the take-up chamber into the magazine.

2. For use in a camera having a film loading chamber sized to hold a film magazine containing a length of photographic film containing at each side a row of sprocket holes, a film take-up chamber, an image window located between the two chambers, rewind means engageable with the film magazine for rewinding exposed film from the take-up chamber back into the film magazine, and rear cover located behind the film chambers and the image window and adapted to close off the same, a film transport assembly comprising a slide plate mounted on the inner surface of the rear cover, and having a shaft extending through a slot in the rear cover, an actuating member connected to the free end of the shaft for sliding movement along the outer surface of the rear cover whereby to slide the slide plate within the rear cover across the image window, and a pair of film engaging fingers pivotally mounted on the slide plate and extending downwardly toward the image window, spring means urging said fingers to a holding position in which they are located to engage and retain a pair of the sprocket holes in the film for advancing a frame of the film across the image window when the slide plate is slid across said slot toward said film take-up chamber, the fingers being pivotable to locate them above the plane of the socket holes when the slide plate is slid in the opposite direction, and manually rotatable means on said actuating member for pivoting said fingers against the action of said spring means to a retracted position in which said fingers are raised above said sprocket holes whereby said rewind means may be operated to rewind said film into the film magazine.

3. For use in a camera having a film loading chamber sized to hold a film magazine containing a length of photographic film containing sprocket holes, a film take-up chamber, an image window located between the two chambers, rewind means engageable with the film magazine for rewining exposed film from the take-up chamber back into the film magazine, and a rear cover located behind the film chambers and the image window and adapted to close off the same, a film transport assembly comprising a slide plate mounted on the inner surface of the rear cover, and having a shaft extending through a slot in the rear cover, an actuating member connected to the free end of the shaft for sliding movement along the outer surface of the rear cover whereby to slide the slide plate within the rear cover across the image window, and a film engaging finger pivotally mounted on the slide plate and extending downwardly toward the image window, spring means urging said finger to a holding position in which it is positioned to engage and retain one of the sprocket holes in the film for advancing a frame of the film across the image window when the slide plate is slid from one end of the slot to the other in the direction of said film take-up chamber, the finger being pivotable against the action of said spring means to locate it above the plane of the sprocket holes when the slide plate is slid in the opposite direction, and rotatable means on said actuating member for manually retracting said finger from its holding position out of contact with the film sprocket holes to permit rewinding of said film into said magazine.

4. For use in a camera having a film loading chamber sized to hold a film magazine containing a length of photographic film containing sprocket holes, a film take-up chamber, an image window located between the two chambers, rewind means engageable with the film magazine for rewinding exposed film from the take-up chamber back into the film magazine, and a rear cover located behind the film chambers and the image window and adapted to close off the same, a film transport assembly comprising a slide plate mounted on the inner surface of the rear cover, and having a shank extending through a slot in the rear cover, an actuating member connected to the free end of the shank for sliding movement along the outer surface of the rear cover whereby to slide the slide plate within the rear cover across the image window, a shaft pivotally mounted on said slide plate, a pair of film engaging fingers mounted on said shaft, and spring means urging said shaft in a direction to normally locate said fingers in a holding position extending downwardly toward the image window and positioned to engage and retain a pair of the sprocket holes in the film for advancing a frame of the film across the image window when the slide plate is slid from one end of the slot to the other in the direction of said film take-up chamber, the fingers being pivotable to locate them above the plane of the sprocket holes when the slide plate is slid in the opposite direction, and rotatable means on said actuating member for retracting the fingers from their holding positions and clear of said film sprocket holes to permit said rewind means to be operated to rewind the film into said magazine, said retracting means comprising a plate extending from said shaft, a cam member located above said plate, a rod carrying said cam member at its lower end and extending upwardly through said rear cover, the upper end of said rod having a finger piece located exteriorly of said cover and turnable to rotate said cam member against said plate for depressing said plate and turning said shaft in a direction to raise said fingers above said film.

5. A film transport assembly according to claim 4 in which said rod extends through said shank and the actuating member carried thereby, the finger piece being located above said actuating member.

6. A film transport assembly according to claim 5 in which said actuating member has detent means engaging said finger piece and releasably holding said finger piece in a normal position in which the cam member is out of depressing engagement with said plate.

7. A film transport assembly according to claim 4 in which the cam member is in the form of a helical strip.

References Cited in the file of this patent

UNITED STATES PATENTS

| | | |
|---|---|---|
| 1,531,182 | Hartmann | Mar. 24, 1925 |
| 2,320,441 | Lessler | June 1, 1943 |
| 2,591,417 | Frye | Apr. 1, 1952 |
| 2,741,168 | Schreiber | Apr. 10, 1956 |
| 2,795,174 | Salje | June 11, 1957 |